United States Patent [19]
Yoshizawa

[11] Patent Number: 6,043,919
[45] Date of Patent: Mar. 28, 2000

[54] FREQUENCY CHARACTERISTIC CORRECTION SYSTEM FOR OPTICAL NETWORK

[75] Inventor: Munetoshi Yoshizawa, Tokyo, Japan

[73] Assignee: NEC Corporation, Tokyo, Japan

[21] Appl. No.: 09/018,302

[22] Filed: Feb. 3, 1998

[30] Foreign Application Priority Data

Feb. 4, 1997 [JP] Japan ................................ 9-021609

[51] Int. Cl.[7] .................................................. H04B 10/02
[52] U.S. Cl. ................... 359/177; 333/16; 179/175.31 R
[58] Field of Search .................... 359/110, 161, 359/174, 176, 177; 370/252; 375/226, 227

[56] References Cited

U.S. PATENT DOCUMENTS

| 4,201,959 | 5/1980 | Niiro et al. | ................................. | 333/16 |
| 4,278,850 | 7/1981 | Sato et al. | ............................ | 179/175.31 |
| 5,293,260 | 3/1994 | Kikawa et al. | ........................... | 359/177 |

FOREIGN PATENT DOCUMENTS

| 4-14917 | 1/1992 | Japan | .................................... | 359/174 |

4-287523  10/1992  Japan .

*Primary Examiner*—Jason Chan
*Assistant Examiner*—Dalzid Singh
*Attorney, Agent, or Firm*—Whitham, Curtis & Whitham

[57] ABSTRACT

The object of the present invention is to reduce the man-hours for correction of the frequency characteristic of an optical network thereby to augment the productivity. A frequency characteristic correction system for an optical network includes a plurality of optical repeaters connected in analog repeating connection to each other for transmitting an analog signal, each of which includes frequency characteristic measurement means for measuring a frequency characteristic based on a testing sine wave inputted by repeating, frequency characteristic discrimination means for comparing the frequency characteristic measured by the frequency characteristic measurement means with a reference value set in advance to discriminate whether or not the frequency Characteristic is near the reference value and generating a control signal for flattening the frequency characteristic, and frequency characteristic equalization means for flattening the frequency characteristic of the testing sine wave in response to the control signal generated by the frequency characteristic discrimination means, and correction of the frequency characteristic is performed in the entire network.

4 Claims, 5 Drawing Sheets ows an example of a
FREQUENCY CHARACTERISTIC CORRECTION SYSTEM FOR OPTICAL NETWORK

BACKGROUND OF THE INVENTION

1. Field of the Invention

This invention relates to a frequency correction system for correcting a frequency characteristic of a network, and more particularly to a frequency correction system for correcting a frequency characteristic of an optical network which repeats and transmits an analog signal.

2. Description of the Related Art

Conventionally, an optical network connected in an analog repeating connection is composed of optical repeaters connected in multiple stages. However, where optical repeaters are connected in multiple stages, displacements in frequency characteristic are accumulated and this deteriorate the frequency characteristic of the network. Therefore, in order to flatten the frequency characteristic of the network, the frequency characteristic of each of the optical repeaters connected in multiple stages is defined strictly and adjusted.

Further, if the frequency characteristic of the network is bad after the optical repeaters are connected in multiple stages, then the frequency characteristic is adjusted again to effect correction of the frequency characteristic of the network.

However, such a conventional optical network as described above is disadvantageous in that, since, in order to flatten the frequency characteristic of the network, the frequency characteristics of the optical repeaters connected in multiple stages must be defined strictly and adjusted, and, when the frequency characteristic of the network is bad after the optical repeaters are connected in multiple stages, the frequency characteristics must be adjusted again, requiring man-hours for the adjustment.

The conventional optical network is disadvantageous also in that, when it is tried to increase optical repeaters to change the system after the network is constructed, since there is the possibility that the frequency characteristic of the network may be deteriorated, the frequency characteristic must be adjusted again.

SUMMARY OF THE INVENTION t is an object of the present invention to provide a frequency characteristic correction system for an optical network which can reduce the man-hours for correction of the frequency characteristic of the optical network thereby to augment the productivity and allow simple re-adjustment of the frequency characteristic of the optical network even when the constriction of the network is changed by additional installation of optical repeaters.

In the present invention, frequency characteristic measurement means provided in each of a plurality of optical repeaters connected in analog repeating connection to each other for transmitting an analog signal measures a frequency characteristic based on a testing sine wave inputted by repeating, and frequency characteristic discrimination means compares the frequency characteristic measured by the frequency characteristic measurement means with a reference value set in advance to discriminate whether or not the frequency characteristic is near the reference value and generates a control signal for flattening the frequency characteristic, and then, frequency characteristic equalization means performs flattening of the frequency characteristic of the testing sine wave in response to the control signal generated by the frequency characteristic discrimination means.

Since correction of the frequency characteristic is performed by the entire network in this manner, it is not necessary to strictly define and adjust the frequency characteristic of each of the optical repeaters connected in multiple stages in order to flatten the frequency characteristic of the network. Further, even when repeaters are increased after the optical repeaters are connected in multiple stages, the frequency characteristic can be adjusted while the network is kept constructed.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
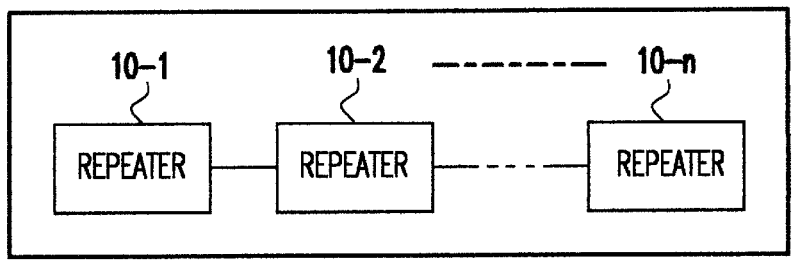
FIG. 1 is a block diagram showing an example of a construction of an optical network composed of n repeaters connected to each other.

Generally, an optical network is composed of n repeaters 10-1 to 10-n connected in series as shown in FIG. 1.

Figure 2:
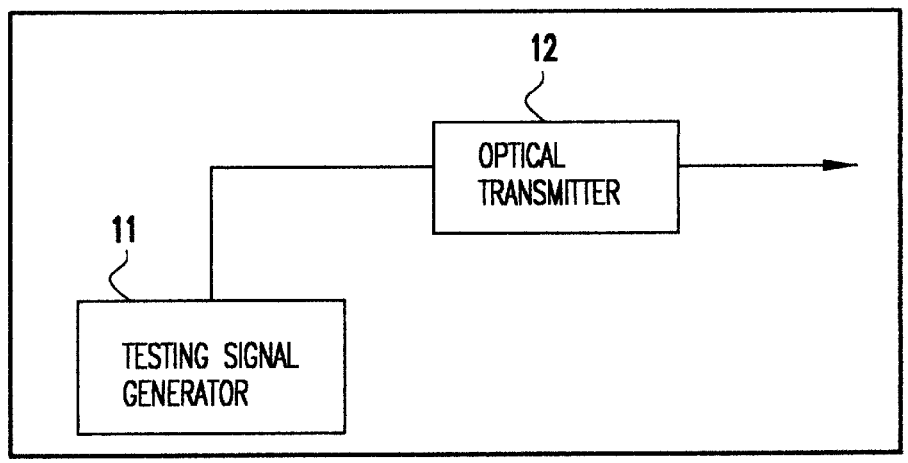
FIG. 2 is a block diagram showing an embodiment of one of the repeaters shown in FIG. 1.

Repeater 10-1 in the present embodiment includes, as shown in FIG. 2, testing signal generator 11 for generating a testing sine wave for correction, and optical transmitter 12 for converting the testing sine wave generated by testing signal generator 11 into an optical signal and transmitting the optical signal to repeaters 10-2 to 10-n.

Figure 3:
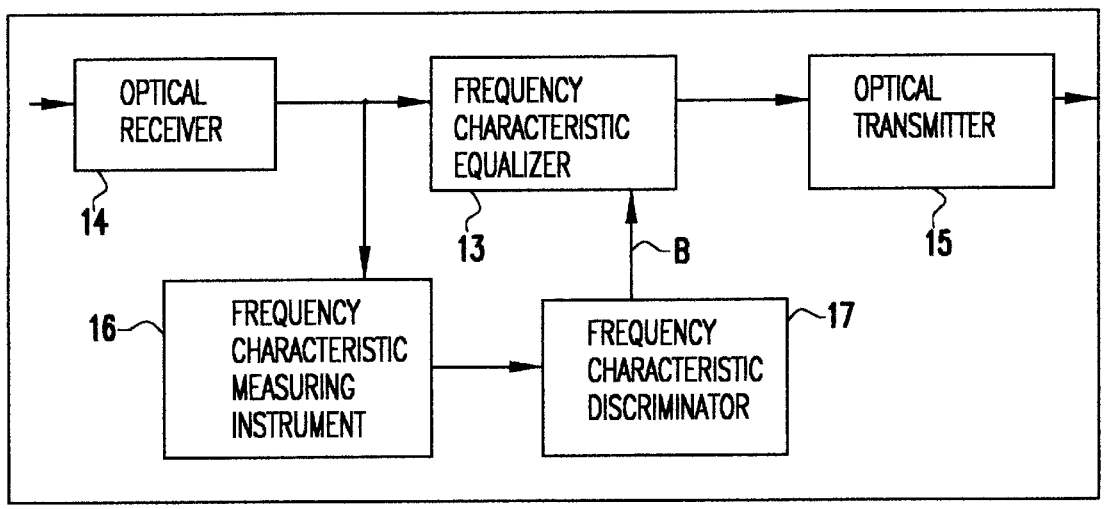
FIG. 3 is a block diagram showing an embodiment of the other repeaters shown in FIG. 1.
Figure 4:
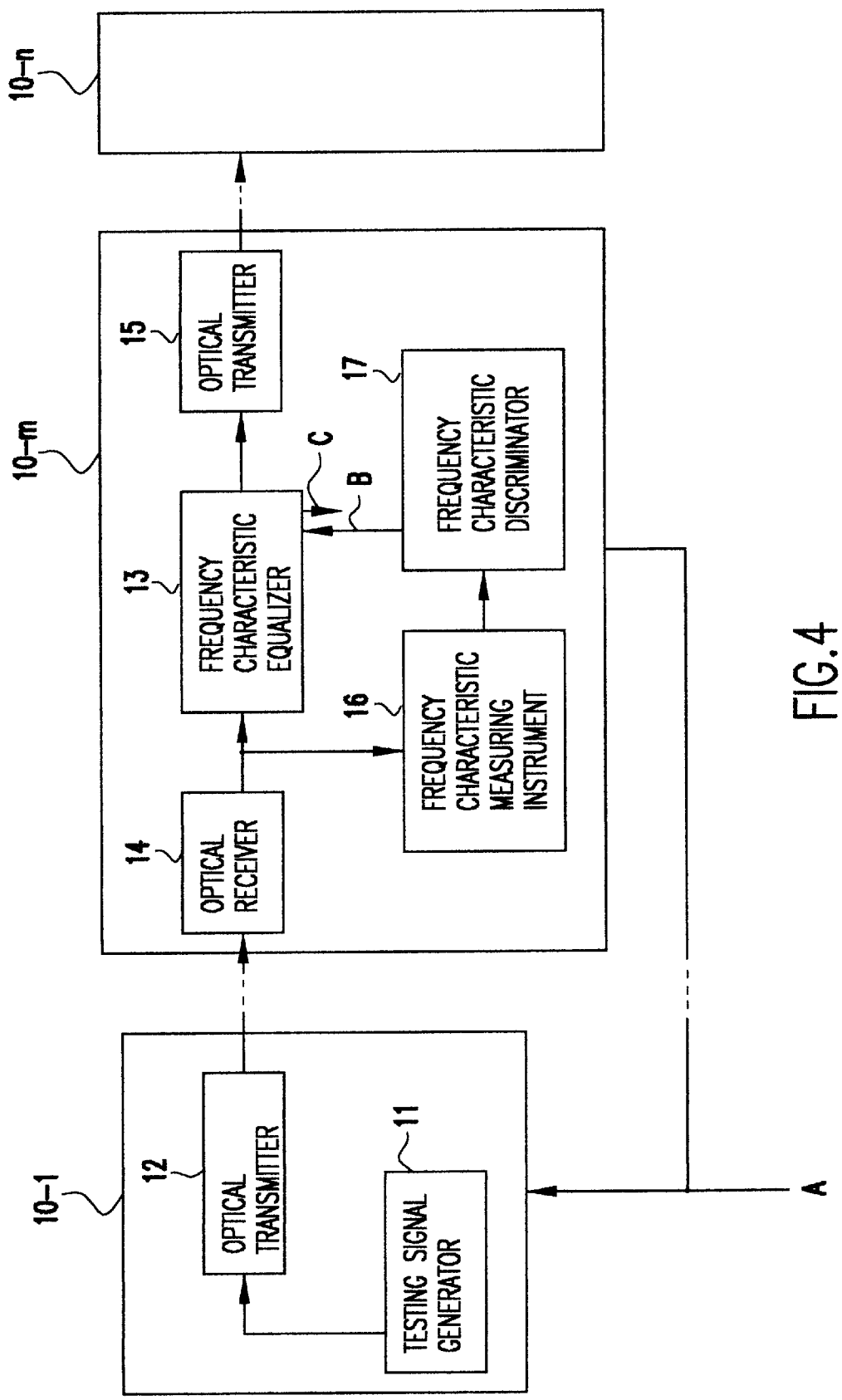
FIG. 4 is a block diagram illustrating frequency characteristic correction operation of the network shown in FIGS. 1 to 3.

Each of repeaters 10-2 to 10-n in the present embodiment includes, as shown in FIG. 3, optical receiver 14 for converting a testing sine wave in the form of an optical signal transmitted from repeater 10-1 into an electric signal and outputting the electric signal, frequency characteristic measuring instrument 16 for measuring the frequency characteristic of the testing sine wave based on the electric signal outputted from optical receiver 14, frequency characteristic discriminator 17 for comparing the frequency characteristic measured by frequency characteristic measuring instrument 16 with a reference value set in advance to discriminate whether or not the frequency characteristic is near the reference value and generating control signal B for flattening the frequency characteristic, frequency characteristic equalizer 13 for flattening the frequency characteristic of the testing sine wave after conversion into the electric signal by optical receiver 14 in response to control signal B generated by frequency characteristic discriminator 17 and outputting the testing sine wave, and optical transmitter 15 converting the testing sine wave outputted from frequency characteristic equalizer 13 into an optical signal and outputting the optical signal In the following, correction operation for the frequency characteristic of the optical network constructed in such a manner as described above is described with reference to FIG. 4.

In the present embodiment, when correction of the frequency characteristics of repeaters 10-1 to 10-m is to be performed, frequency designation signal A for generating an arbitrary testing sine wave for performing correction of the frequency characteristic is inputted to repeaters 10-1 and 10-m.

When frequency designation signal A is inputted to repeater 10-1, testing signal generator 11 provided in repeater 10-1 generates a testing sine wave based on frequency designation signal A inputted thereto.

When the testing sine wave is generated by testing signal generator 11, it is inputted to optical transmitter 12 and converted into an optical signal by optical transmitter 12, and the optical signal is transmitted to repeater 10-m.

When the testing sine wave transmitted from repeater 10-1 is received by repeater 10-m, optical receiver 14 provided in repeater 10-m converts the testing sine wave inputted thereto into an electric signal, which is inputted to frequency characteristic measuring instrument 16 and frequency characteristic equalizer 13.

Consequently, frequency characteristic measuring instrument 16 detects the level of the testing sine wave inputted thereto.

Then, the level of the testing sine wave detected by frequency characteristic measuring instrument 16 is inputted to frequency characteristic discriminator 17, in which it is compared with a reference value set in advance to discriminate whether the frequency characteristic of the testing sine wave after conversion into the electric signal by the optical receiver 14 should be raised or dropped. Then, based on a result of the discrimination, control signal B is outputted from frequency characteristic discriminator 17.

When control signal, B is outputted from frequency characteristic discriminator 17, it is inputted to frequency characteristic equalizer 13, by which adjustment of the frequency characteristic of the testing sine wave inputted from optical receiver 14 is performed in response to control signal B. When the adjustment is completed, the testing sine wave whose frequency characteristic has been adjusted and control completion signal C are outputted from frequency characteristic equalizer 13.

The testing sine wave outputted from frequency characteristic equalizer 13 is converted into an optical signal by optical transmitter 15 and transmitted to a repeater connected in the following stage.

When control completion signal C is outputted from frequency characteristic equalizer 13, frequency designation signal A with which the frequency to be generated by testing signal generator 11 will be displaced by a frequency amount set in advance is inputted to repeaters 10-1 and 10-m again.

The sequence of operations described above is performed repetitively to flatten the frequency characteristics of repeaters 10-1 to 10-m of the optical network.

In the following, a working example of the embodiment described above is described with reference to the drawings.

Figure 5:
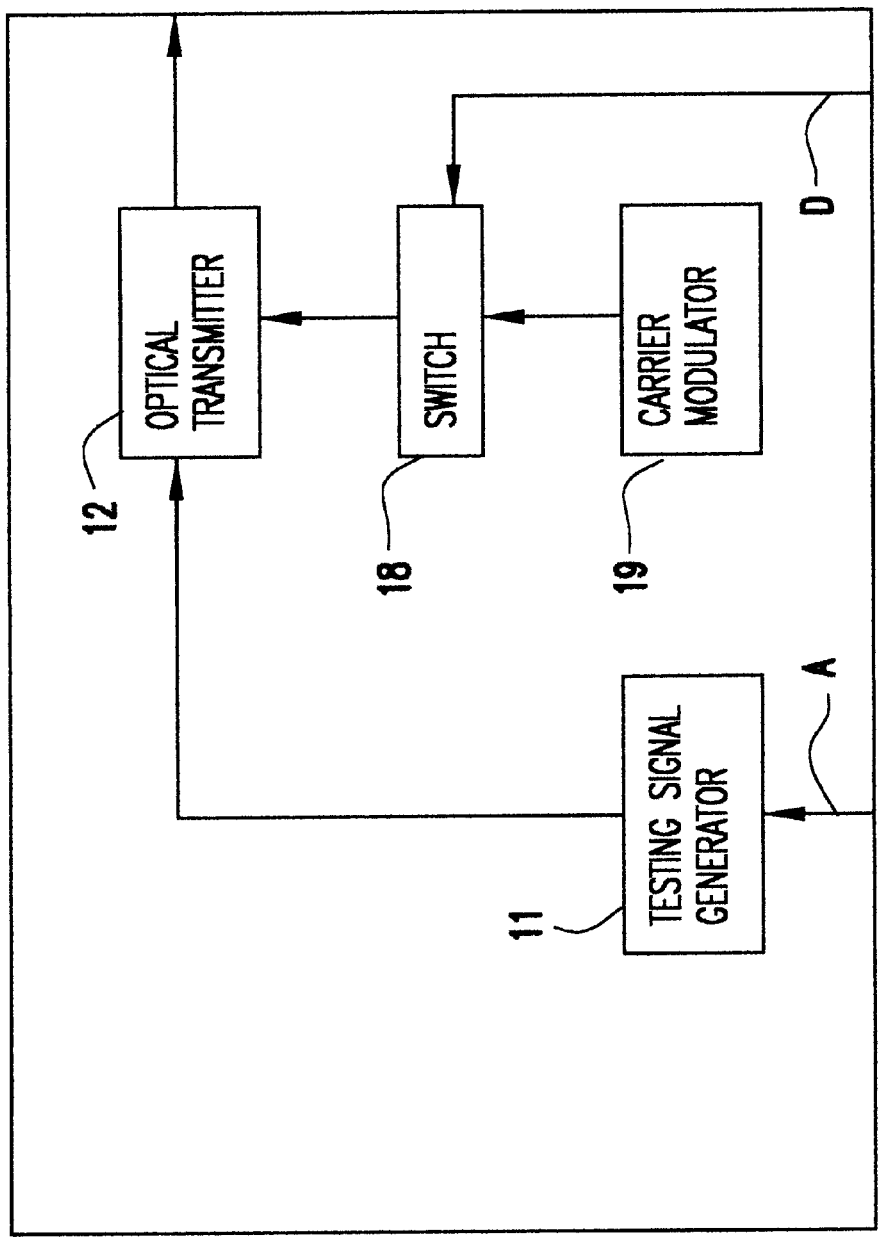
FIG. 5 is a block diagram showing a working example of one of the repeaters shown in FIG. 1.

Repeater 10-1 in the present working example includes, as shown in FIG. 5, testing signal generator 11 for generating a testing sine wave for correction in response to frequency designation signal A inputted thereto from the outside, carrier modulator 19 for modulating and outputting a carrier, optical transmitter 12 for converting the testing sine wave generated by testing signal generator 11 or the carrier outputted from carrier modulator 19 into an optical signal and transmitting the optical signal to repeaters 10-2 to 10-n, and switch 18 for controlling inputting of the carrier outputted from carrier modulator 19 to optical transmitter 12 in response to correction start signal D inputted thereto from the outside.

Figure 6:
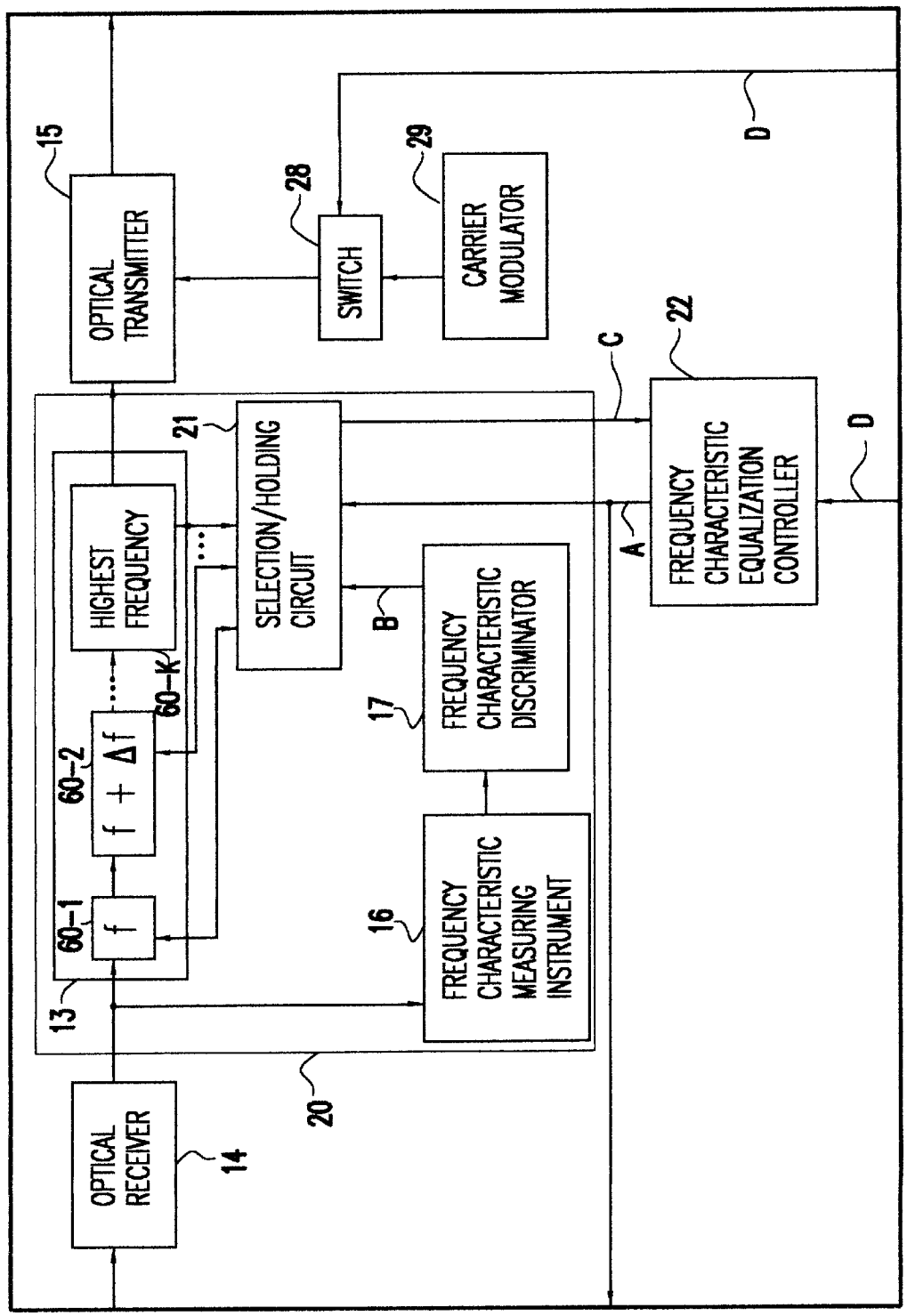
FIG. 6 is a block diagram showing a working example of the other repeaters shown in FIG. 1.

Each of repeaters 10-2 to 10-n in the present working example includes, as shown in FIG. 6, optical receiver 14 for converting a testing sine wave in the form of an optical signal transmitted thereto from repeater 10-1 into an electric signal and outputting the electric signal, frequency characteristic equalization controller 22 for generating and outputting frequency designation signal A in response to correction start signal D inputted thereto from the outside, equalizer 20 for correcting the frequency characteristic of the testing sine wave in response to the electric signal outputted from optical receiver 14 and frequency designation signal A outputted from frequency characteristic equalization controller 22, carrier modulator 29 for modulating and outputting a carrier, optical transmitter 15 for converting the testing sine wave whose frequency has been corrected by equalizer 20 or the carrier outputted from carrier modulator 29 into an optical signal and transmitting the optical signal to a repeater in the next stage, and switch 28 for controlling inputting of the carrier outputted from carrier modulator 29 to optical transmitter 15 in response to correction start signal D inputted thereto from the outside. Equalizer 20 includes frequency characteristic measuring instrument 16 for measuring the frequency characteristic of the testing sine wave based on the electric signal outputted from optical receiver 14, frequency characteristic discriminator 17 for comparing the frequency characteristic measured by frequency characteristic measuring instrument 16 with a reference value set in advance to discriminate whether or not the frequency characteristic is within the reference value and generating control signal B for flattening the frequency characteristic, frequency characteristic equalizer 13 for flattening the frequency characteristic of the testing sine wave after conversion into the electric signal by optical receiver 14, and selection/holding circuit 21 for controlling the frequency correction operation of frequency characteristic equalizer 13 in response to frequency designation signal. A outputted from frequency characteristic equalization controller 22 and control signal B generated by frequency characteristic discriminator 17.

Figure 7:
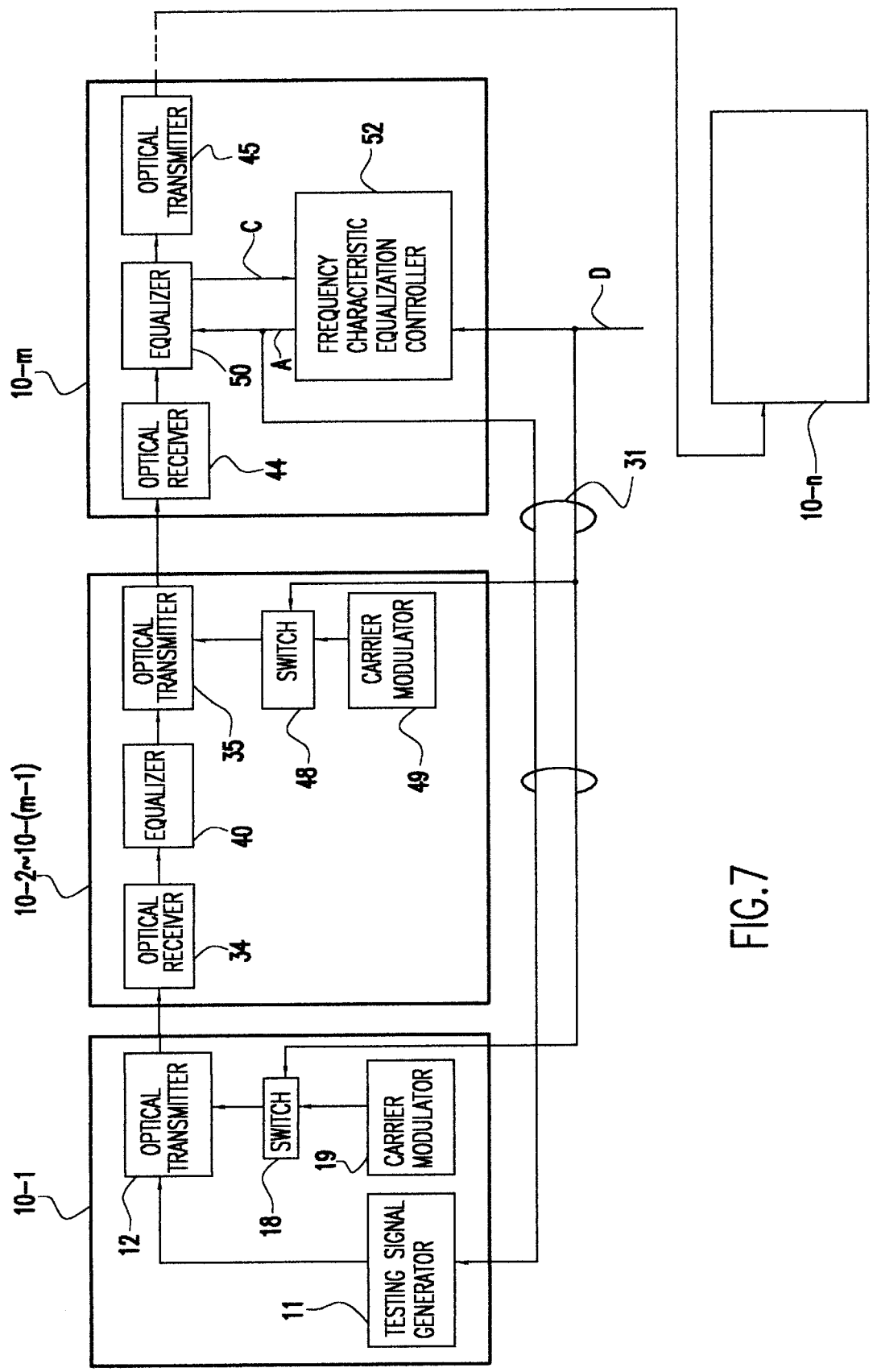
FIG. 7 is a block diagram illustrating frequency characteristic correction operation of the network shown in FIGS. 1, 5 and 6.

In the following, frequency characteristic correction operation of the network constructed in such a manner as described above is described with reference to FIG. 7.

In the present working example, when frequency correction of repeaters 10-1 to 10-m is to be performed, correction start signal D is first inputted to repeaters 10-1 to 10-m manually or under the control from the outside. It is to be noted that, between repeaters 10-1 to 10-(m-1), correction start signal D is transferred by optical circuit 31.

Correction start signal D inputted to repeaters 10-1 to 10-(m-1) is inputted to switch 18 provided in repeater 10-1 and switch 48 provided in each of repeaters 10-2 to 10-(m-1) so that insertion of the carrier modulated by carrier modulators 19 and 49 into optical circuit 31 is stopped.

Meanwhile, correction start signal D inputted to repeater 10-m is inputted to frequency characteristic equalization controller 52 provided in repeater 10-m. Consequently, frequency characteristic equalization 52 generates and outputs frequency designation signal A for lowest frequency f of a used band used in the present network.

Frequency designation signal A outputted from frequency characteristic equalization controller 52 is inputted to equalizer 50 and testing signal generator 11 provided in repeater 10-1. It is to be noted that frequency designation signal A is transferred to testing signal generator 11 by optical circuit 31.

Consequently, testing signal generator 11 generates a testing sine wave having frequency f which is based on frequency designation signal A.

The testing sine wave generated by testing signal generator 11 is converted into an optical signal by optical transmitter 12 and repeated by optical receiver 34, equalizer 40 and optical transmitter 35 provided in each of repeaters 10-2 to 10-(m-1) connected in multiple stages.

The repeated testing sine wave is inputted to repeater 10-m, in which it is converted into an electric signal by optical receiver 44 provided in repeater 10-m and inputted to equalizer 50.

Consequently, equalizer 50 performs frequency characteristic correction of the testing sine wave to frequency f using a correction system which will be hereinafter described in response to the electric signal outputted from optical receiver 44 and frequency designation signal A outputted from frequency characteristic equalization controller 52. When the correction operation is completed, correction completion signal C is outputted.

When correction completion signal C is outputted from equalizer 50, it is inputted to frequency characteristic equalization controller 52, by which frequency designation signal A to frequency f+$\Delta$f which is higher by step $\Delta$f set in advance is generated.

Thereafter, frequency characteristic correction is performed similarly to that to frequency f, and while the frequency is successively raised by $\Delta$f, such frequency characteristic correction is successively performed until the highest frequency in the used band is reached.

In the following, frequency characteristic correction operation of a testing sine wave by the equalizer is described in detail with reference to FIG. 6.

When frequency designation signal A inputted to equalizer 20 is inputted to selection/holding circuit 21, equalizer 60-1 for frequency f of frequency characteristic equalizer 13 is selected while equalizers 60-2 to 60-k for the frequencies other than frequency f remain in a holding state.

The testing sine wave inputted to equalizer 20 and having frequency f is inputted to frequency characteristic equalizer 13 and inputted also to frequency characteristic measuring instrument 16.

Consequently, frequency characteristic measuring instrument 16 measures the frequency characteristic with respect to frequency f, and a result of the measurement is inputted to frequency characteristic discriminator 17. Frequency characteristic discriminator 17 discriminates whether or not the measured frequency characteristic exhibits some deterioration, and outputs control signal B based on a result of the discrimination.

Control signal B outputted from frequency characteristic discriminator 17 is inputted to selection/holding circuit 21, by which correction of the frequency characteristic with respect to frequency f of the testing sine wave inputted to equalizer 20 is performed in response to on control signal B.

Thereafter, when the correction is completed, correction completion signal C is outputted from equalizer 20.

While preferred embodiments of the present invention have been described using specific terms, such description is for illustrative purposes only, and it is to be understood that changes and variations may be made without departing from the spirit or scope of the following claims.

What is claimed is:

1. A frequency characteristic correction system for an optical network, comprising:

a plurality of optical repeaters connected in analog repeating connection to each other for transmitting an analog signal;

each of said optical repeaters including:
frequency characteristic measurement means for measuring a frequency characteristic based on a testing sine wave inputted by repeating;
frequency characteristic discrimination means for comparing the frequency characteristic measured by said frequency characteristic measurement means with a reference value set in advance to discriminate whether or not the frequency characteristic is near the reference value and generating a control signal for flattening the frequency characteristic; and
frequency characteristic equalization means for flattening the frequency characteristic of the testing sine wave in response to the control signal generated by said frequency characteristic discrimination means.

2. A frequency characteristic correction system for an optical network as claimed in claim 1, wherein each of said optical repeaters further includes frequency characteristic equalization control means for outputting a frequency designation signal for designating a frequency for measurement of the frequency characteristic in response to a correction start signal inputted thereto from the outside, and corrects the frequency characteristic in transmission of a testing sine wave having a frequency designated by the frequency designation signal.

3. A frequency characteristic correction system for an optical network as claimed in claim 2, wherein said frequency characteristic equalization control means changes the frequency, designated by the frequency designation signal to a value higher by a predetermined value determined in advance each time correction of the frequency characteristic is performed.

4. A frequency characteristic correction system for an optical network, comprising:

a plurality of optical repeaters connected in analog repeating connection to each other for transmitting an analog signal;

each of said optical repeaters including:
optical receive means for converting a testing sine wave in the form of an optical signal inputted by repeating into an electric signal and outputting the electric signal;
frequency characteristic measurement means for measuring a frequency characteristic based on a testing sine wave outputted from said optical receive means;
frequency characteristic discrimination means for comparing the frequency characteristic measured by said frequency characteristic measurement means with a reference value set in advance to discriminate whether or not the frequency characteristic is near the reference value and generating a control signal for flattening the frequency characteristic; and
frequency characteristic equalization means for flattening the frequency characteristic of the testing sine wave in response to the control signal generated by said frequency characteristic discrimination means.

* * * * *